(12) United States Patent
Yang

(10) Patent No.: US 7,827,436 B2
(45) Date of Patent: Nov. 2, 2010

(54) METHOD OF UPDATING A DUAL REDUNDANT CHASSIS MANAGEMENT SYSTEM

(75) Inventor: Chih-Ching Yang, Taipei (TW)

(73) Assignee: Inventec Corporation, Taipei (TW)

( * ) Notice: Subject to any disclaimer, the term of this patent is extended or adjusted under 35 U.S.C. 154(b) by 985 days.

(21) Appl. No.: 11/642,769

(22) Filed: Dec. 21, 2006

(65) Prior Publication Data
US 2008/0155300 A1   Jun. 26, 2008

(51) Int. Cl.
*G06F 11/00* (2006.01)
(52) U.S. Cl. ........................................ 714/4
(58) Field of Classification Search ............. 714/6, 714/4
See application file for complete search history.

(56) References Cited

U.S. PATENT DOCUMENTS

| | | | | |
|---|---|---|---|---|
| 6,097,722 | A * | 8/2000 | Graham et al. | 370/395.21 |
| 7,020,770 | B2 * | 3/2006 | Smith et al. | 713/1 |
| 7,330,999 | B2 * | 2/2008 | Davies et al. | 714/9 |
| 7,401,254 | B2 * | 7/2008 | Davies | 714/11 |
| 7,467,169 | B2 * | 12/2008 | Gole et al. | 1/1 |
| 7,565,566 | B2 * | 7/2009 | Davies et al. | 714/4 |
| 2003/0018927 | A1 * | 1/2003 | Gadir et al. | 714/4 |
| 2003/0101426 | A1 * | 5/2003 | Sarkinen et al. | 716/12 |
| 2004/0010680 | A1 * | 1/2004 | Smith et al. | 713/1 |
| 2005/0010838 | A1 * | 1/2005 | Davies et al. | 714/100 |
| 2005/0080933 | A1 * | 4/2005 | Herring | 709/249 |
| 2005/0265359 | A1 * | 12/2005 | Drew et al. | 370/400 |
| 2006/0090094 | A1 * | 4/2006 | McDonnell et al. | 714/4 |
| 2006/0174159 | A1 * | 8/2006 | Borresen et al. | 714/13 |
| 2006/0206602 | A1 * | 9/2006 | Hunter et al. | 709/223 |
| 2007/0076591 | A1 * | 4/2007 | Khan | 370/216 |
| 2007/0100964 | A1 * | 5/2007 | Davies et al. | 709/217 |
| 2007/0233833 | A1 * | 10/2007 | Wang | 709/223 |
| 2008/0086580 | A1 * | 4/2008 | Zhang et al. | 710/107 |
| 2008/0153317 | A1 * | 6/2008 | Hsu et al. | 439/61 |
| 2008/0279183 | A1 * | 11/2008 | Wiley et al. | 370/389 |
| 2008/0288664 | A1 * | 11/2008 | Pettey et al. | 710/5 |

* cited by examiner

Primary Examiner—Robert Beausoliel
Assistant Examiner—Amine Riad
(74) Attorney, Agent, or Firm—Bacon & Thomas, PLLC

(57) ABSTRACT

The present invention discloses a method of updating a dual redundant chassis management system, and the method is applied in a server. If the server obtains a change message, it creates a virtual channel between an active chassis management system and a standby chassis management system, so that the active chassis management system can be updated according to the change message, and the change message can be sent to the standby chassis management system through the virtual channel. After the active chassis management system and the standby chassis management system are updated, the virtual channel is closed to provide sufficiency transmission bandwidth and stability for data transmissions, when the server synchronously updates the active chassis management system and the standby chassis management system.

10 Claims, 6 Drawing Sheets

METHOD OF UPDATING A DUAL REDUNDANT CHASSIS MANAGEMENT SYSTEM

FIELD OF THE INVENTION

The present invention relates to a method of updating a dual redundant chassis management system, and more particularly to a method of updating a dual redundant chassis management system while maintaining sufficiency bandwidth and stability of data transmissions.

BACKGROUND OF THE INVENTION

Server is a high-performance computer mainly used as a network node for storing or processing data over a network, and the processing capability, stability, reliability, security, expandability and manageability of a sever are higher than those of a personal computer. Particularly, as various electronic and communication technologies advance and the demand for information distribution becomes increasingly higher, it is very common for companies or organizations to use servers to provide related information, download and email services, and thus it is one of the important factors to evaluate a server by the way of its enhancing the processing capability and stability of the server, so that the server can provide more stable and user-friendly information using environment and service environment. Based on the aforementioned reasons, server manufacturers constantly develop new technologies to solve related technical problems such as an interrupt of data access or network service of a server due to an abnormal condition, so as to improve the stability of the server.

For instance, present servers come with an intelligent platform management interface (IPMI) connected to sensors that are installed for required monitoring elements (such as CPU temperature, voltage, and fan rotation, etc) in a server for collecting a detected value of each sensor by a baseboard management controller (BMC) through different standard interfaces (such as I$^2$C/IPMB interface, serial/modem interface and LAN interface, etc). If the baseboard management controller (BMC) determines from the detected value that there is a serious abnormal event or problem of a monitoring element of a server, the baseboard management controller (BMC) will make necessary corrections, so that the server can continue providing services or pause its services to prevent the occurrence of more serious errors.

However, the foregoing intelligent platform management interface (IPMI) has one baseboard management controller (BMC) only, so that if the baseboard management controller (BMC) fails, the foregoing intelligent platform management interface (IPMI) will not be able to determine whether or not there is a serious abnormal event or problem of the monitoring element in the server. To solve this problem, manufactures install a primary baseboard management controller (BMC) and a standby baseboard management controller (BMC) in the server. By such dual redundant baseboard management controller (BMC), the standby baseboard management controller (BMC) can take over the primary baseboard management controller (BMC) to provide the detected value of each sensor to the intelligent platform management interface (IPMI), if the primary baseboard management controller (BMC) breaks down. In other words, the intelligent platform management interface (IPMI) collects the detected value of each sensor through the standby baseboard management controller (BMC) and continues determining whether or not there is a serious abnormal event or problem of the monitoring elements of the server.

To let the standby baseboard management controller (BMC) have the same detected value of each sensor as the primary baseboard management controller (BMC) in order to immediately take over the primary baseboard management controller (BMC), an update of detected values of the sensors usually takes place between the two baseboard management controllers (BMC) through an intelligent platform management bus (IPMB). However, other IPMI devices (such as an ICMB bridge controller and standby power supply, etc) also use the intelligent platform management bus (IPMB) for data transmission at the same time, and thus the transmission bandwidth of the intelligent platform management bus (IPMB) becomes relatively smaller. As a result, the data transmission of the server will become unstable when lots of detected values of the sensors are transmitted through the intelligent platform management bus (IPMB).

A server usually installs a primary chassis and switch management system (such as a roadrunner and chassis management system, RCMS) and a standby chassis and switch management system to control the chassis (or enclosure) and switch of a server, so that the server can provide various services or resources stably. The standby chassis and switch management system also will take over the primary chassis and switch management system to continue controlling the chassis and switch of the server, whenever there is an abnormal event. The data between the two chassis and switch management systems are updated synchronously through an Ethernet transmission channel or a specific communication protocol defined by a manufacturer. However, the data of the two chassis and switch management systems are transmitted and updated by a specific communication protocol defined by a manufacturer, such that servers produced by different manufacturers cannot use the same communication protocol for transmitting and updating data between the two chassis and switch management systems.

To achieve higher processing capability, stability, reliability, security, expandability and manageability of a server, dual redundant devices or management systems are added to the server, but the synchronous data update process of the present dual redundant devices or management systems may cause technical problems including a reduced transmission bandwidth, an unstable data transmission, and an incompatible communication protocol. Therefore, manufacturers and consumers are more than happy to have a chassis management system capable of updating a server effectively.

SUMMARY OF THE INVENTION

In view of the shortcomings of the prior art, the inventor of the present invention based on years of experience to conduct extensive researches and experiments, and finally invented a method of updating a dual redundant chassis management system in hope of contributing such innovative idea to the general public.

Therefore, it is a primary objective of the present invention to provide a method of updating a dual redundant chassis management system which is applied to a server having an active chassis management system and a standby chassis management system. If the server receives a change message, the server will immediately create a virtual channel between the two chassis management systems, so that the active chassis management system can send the change message to the standby chassis management system through the virtual channel, and the standby chassis management system completes the data update based on the change message, and then closes the virtual channel immediately. Such arrangement maintains a sufficiently wide transmission bandwidth for the server to transmit the updated data between the two chassis management systems and use a universal communication protocol for the data transmission, so that the present invention can be applied in various servers produced by different manufacturers.

To make it easier for our examiner to understand the objective, technical characteristics and performance of the present invention, preferred embodiments accompanied with related drawings are used for illustrating the present invention as follows.

DETAILED DESCRIPTION OF THE PREFERRED EMBODIMENTS

Figure 1:
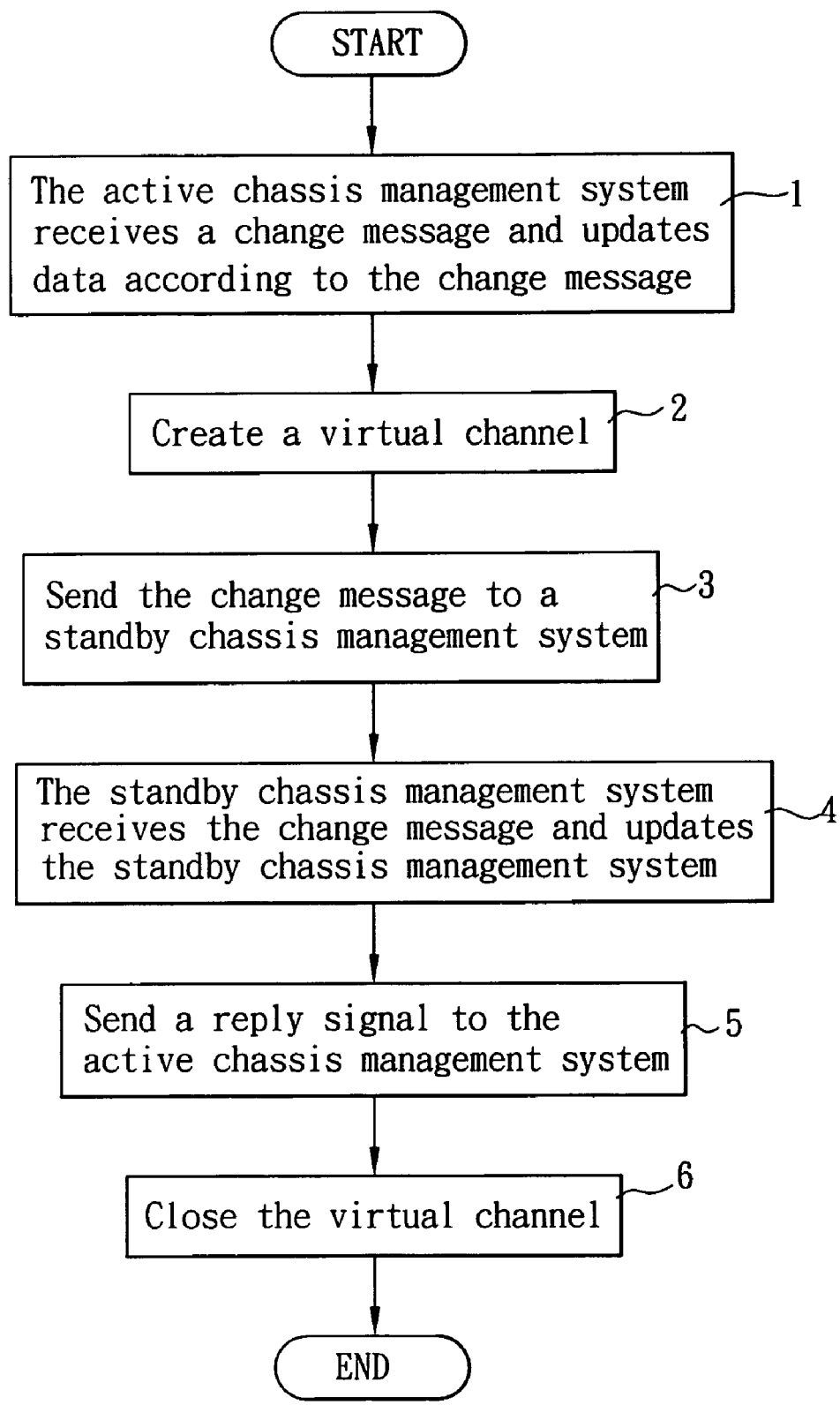
FIG. 1 is a flow chart of the present invention.

The present invention discloses a method of updating a dual redundant chassis management system, which is applied in a server, and the server includes an active chassis management system (or active enclosure management system) and a standby chassis management system (or standby enclosure management system). The active chassis management system performs different controls to the chassis of the server, and the standby chassis management system will take over the active chassis management system if the active chassis management system is abnormal, so as to continue controlling the chassis of the server. Referring to FIG. 1, if the server receives a change message (such as a change of configuration, a change of event or a change of account number to the active chassis management system), the following procedure will take place to update the active chassis management system and the standby chassis management system:

(1) Firstly, the active chassis management system receives a change message and then updates data according to the change message.

Figure 2:
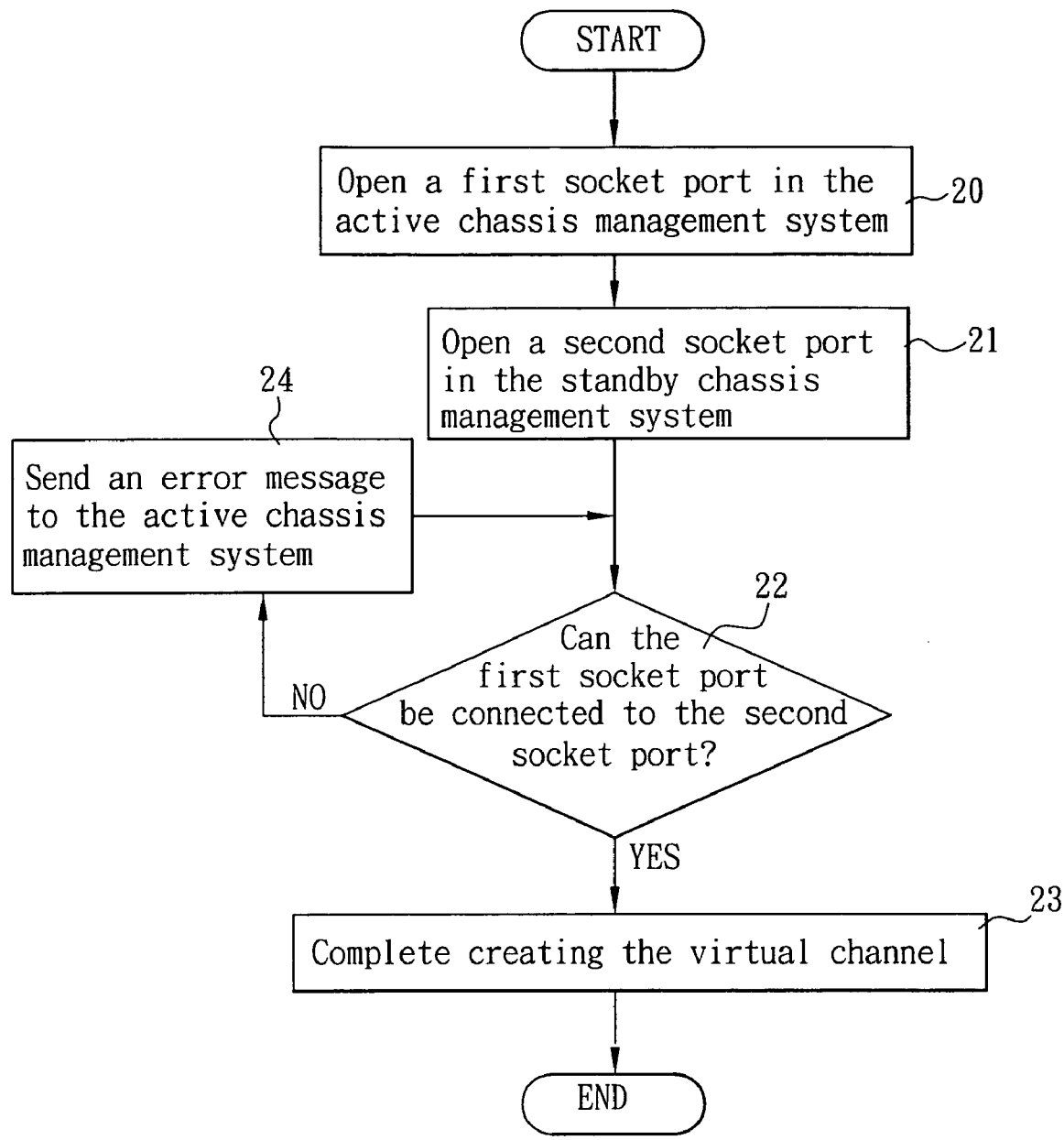
FIG. 2 is a flow chart of creating a virtual channel of the present invention.

(2) A universal communication protocol such as the transmission control protocol/Internet protocol (TCP/IP) is used to create a virtual channel between the active chassis management system and the standby chassis management system. Referring to FIG. 2, the server creates the virtual channel as described below:

Step (20): Open a first socket port in the active chassis management system.

Step (21): Open a second socket port in the standby chassis management system.

Step (22): Determine whether or not the active chassis management system can connect the first socket port to the second socket port; if yes, then go to Step (23), or else go to Step (24);

Step (23): It indicates that the creation of a virtual channel between the active chassis management system and the standby chassis management system is completed and ended.

Step (24): Send an error message to the active chassis management system, and the standby chassis management system continues waiting for the connection with the active chassis management system, and then process according to Step (22).

After the server has received the error message, the error message is sent to a PC computer used by an administrator at a remote end of the server to remind the administrator to troubleshoot and eliminate the abnormal condition. After the abnormal condition between the active chassis management system and the standby chassis management system is eliminated, the synchronous update can be performed successfully.

Figure 3:
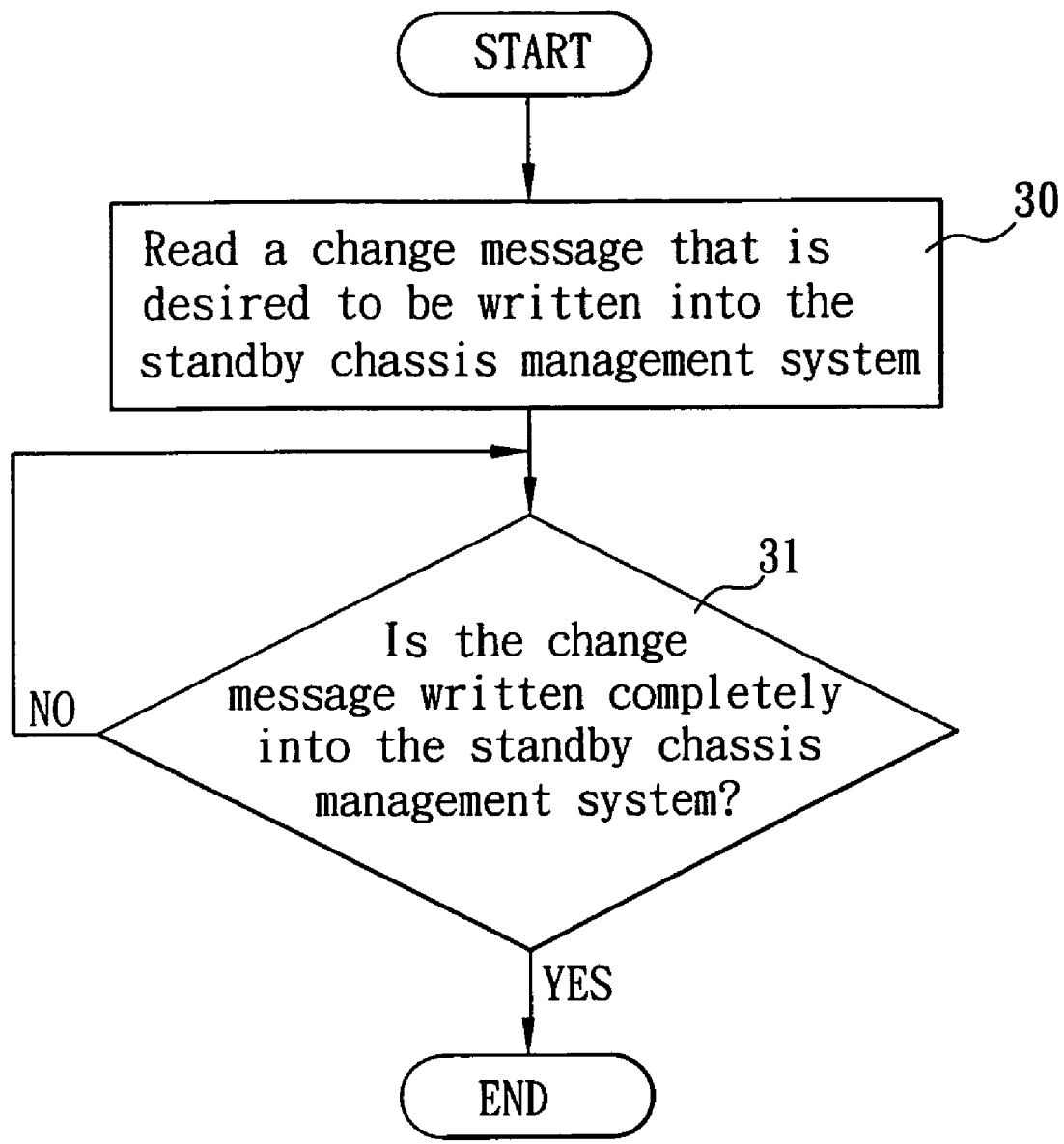
FIG. 3 is a flow chart of sending a change message at an active chassis management system and waiting for a reply signal in accordance with the present invention.
Figure 4:
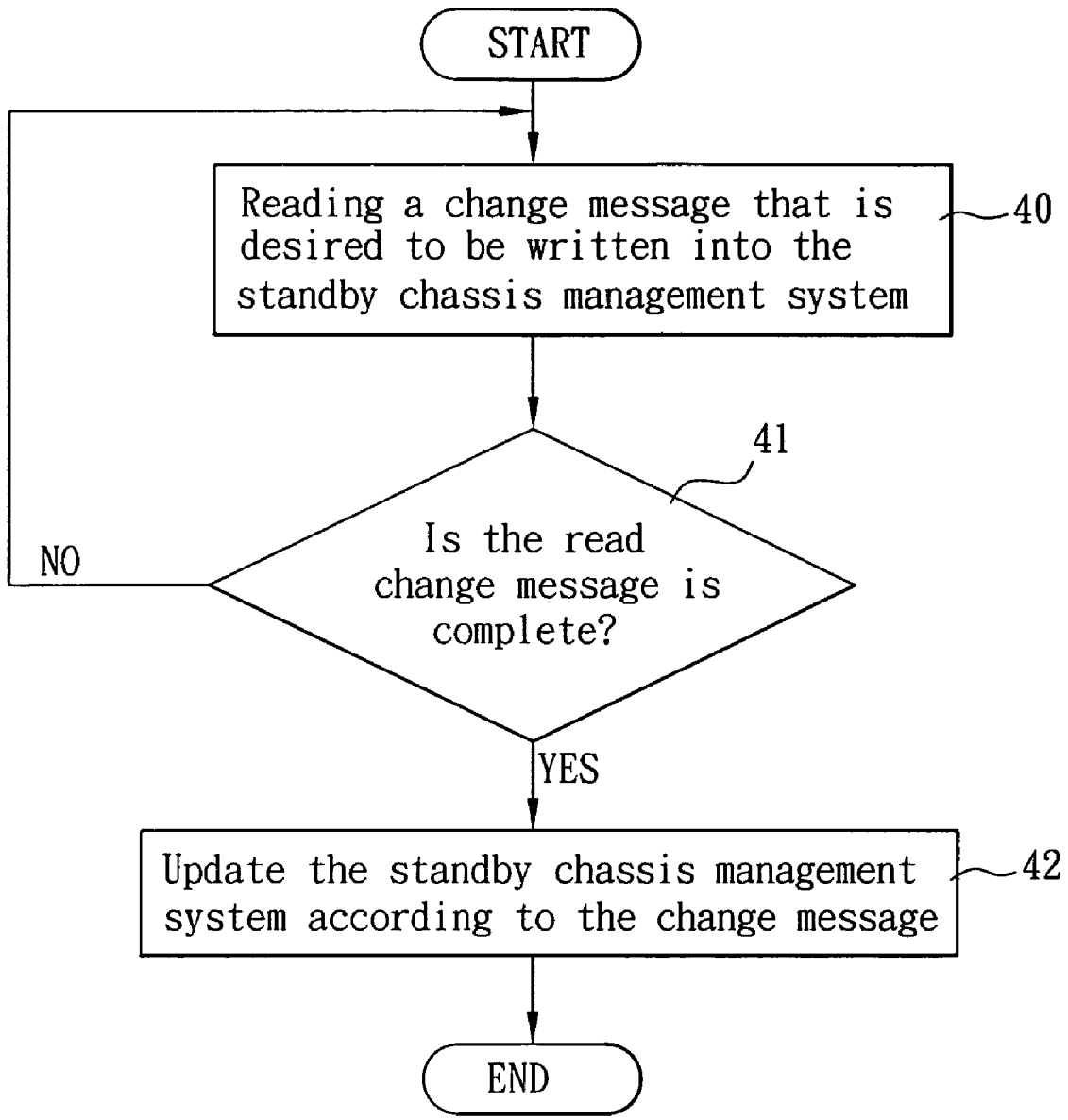
FIG. 4 is a flow chart of receiving a change message at a standby chassis management system and updating a procedure in accordance with the present invention.

(3) The active chassis management system sends the change message to the standby chassis management system through the virtual channel. In this embodiment, the procedure for the server to send the change message in the active chassis management system as shown in FIG. 3 comprises the steps of:

Step (30): reading a change message that is desired to be written into the standby chassis management system through the virtual channel;

Step (31): determining whether or not the change message is written completely into the standby chassis management system; if yes, end the procedure, or else go to Step (31);

(4) The standby chassis management system receives the change message and updates the data. In this embodiment, the procedure for the server to receive the change message and update the data in the standby chassis management system as shown in FIG. 4 comprises the steps of:

Step (40): reading a change message that is desired to be written into the standby chassis management system through the virtual channel;

Step (41): determining whether or not the read change message is complete; if yes, then go to Step (42), or else go to Step (40);

Step (42): updating the data according to the change message and ending the procedure.

Figure 5:
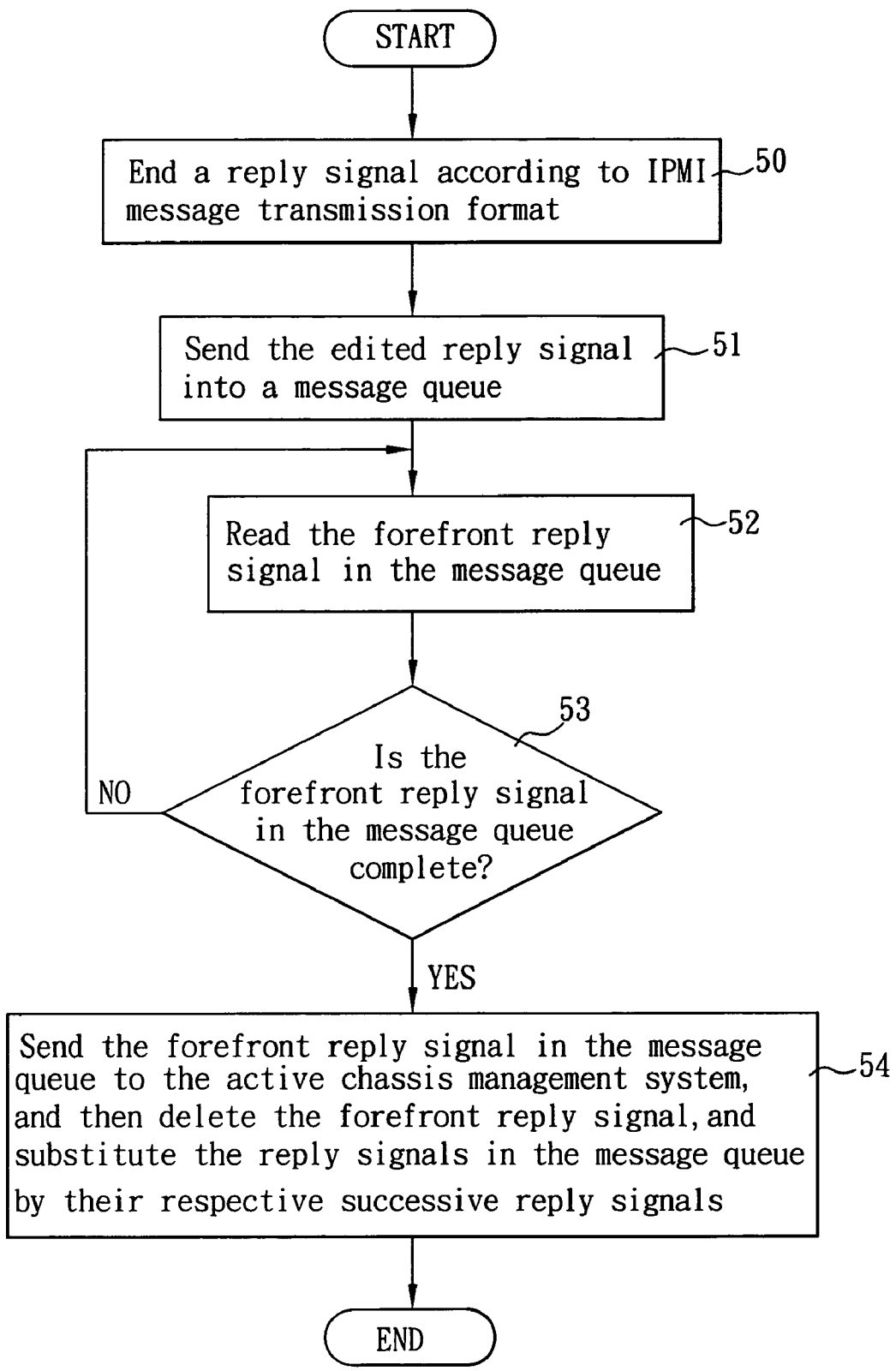
FIG. 5 is a flow chart of sending out a reply signal in accordance with the present invention.

(5) The standby chassis management system sends a reply signal to the active chassis management system through the virtual channel to indicate that the update is completed. In this embodiment, the procedure for the server to send out the reply signal as shown in FIG. 5 comprises the steps of:

Step (50): editing a reply signal according to an intelligent platform management interface (IPMI) message transmission format;

Step (51): sending the edited reply signal into a message queue of the server;

Step (52): reading a forefront reply signal in the message queue;

Step (53): determining whether or not the forefront reply signal in the message queue is complete; if yes, then go to Step (54), or else go to Step (52);

Step (54): Send the forefront reply signal in the message queue to the active chassis management system through the virtual channel, and delete the forefront reply signal, and substitute the reply signals in the message queue by their respective successive reply signals.

Before the server confirms that the standby chassis management system has sent the reply signal to the active chassis management system, the forefront replay signal in the message queue will not be deleted to assure that all reply signals can be sent to the active chassis management system.

Figure 6:
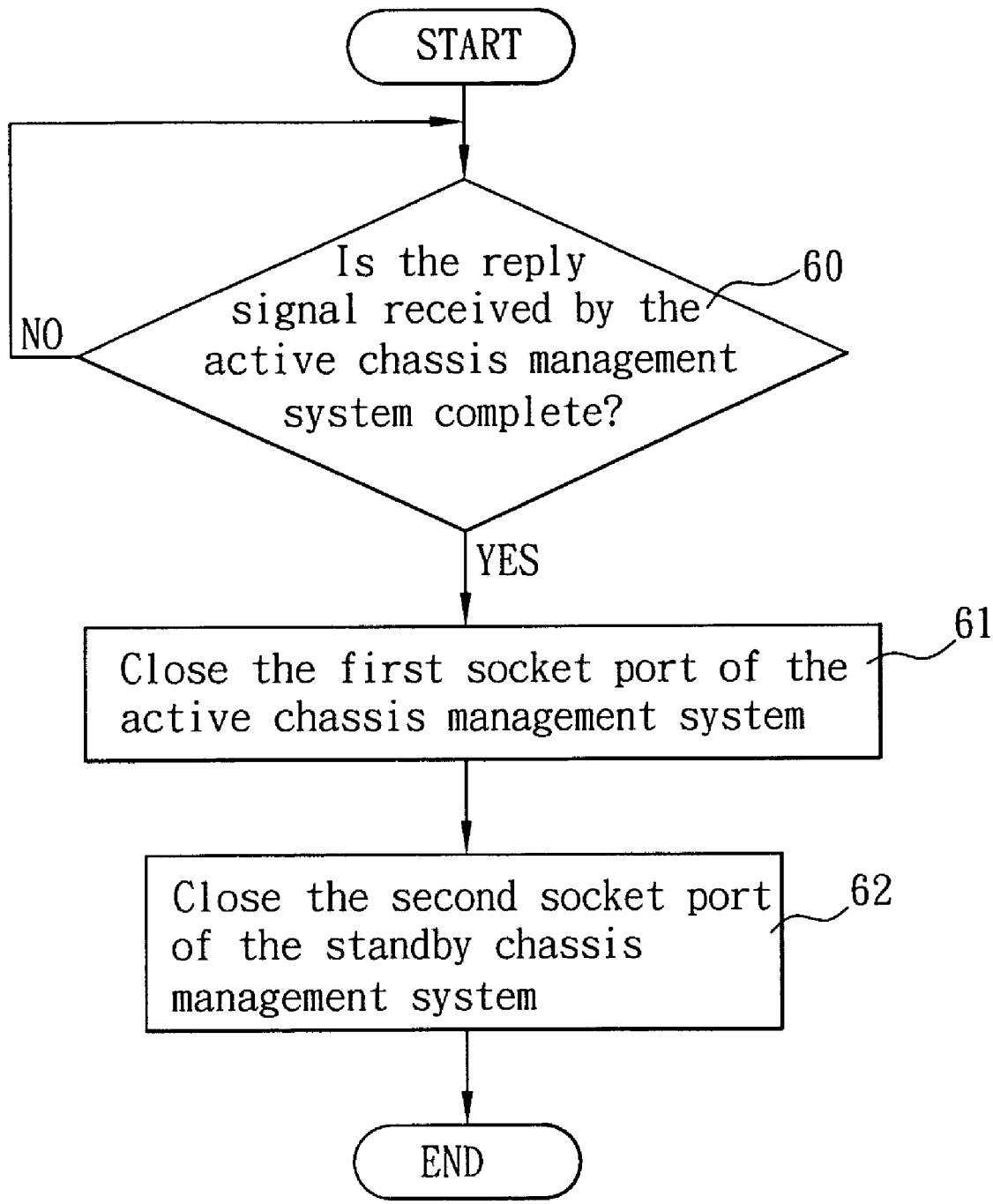
FIG. 6 is a flow chart of closing a virtual channel in accordance with the present invention.

(6) The active chassis management system receives a reply signal, and then immediately closes the virtual channel. The procedure for the server to close the virtual channel as shown in FIG. 6 comprises the steps of:

Step (60) determining whether or not the reply signal received by the active chassis management system is complete; if yes, then go to Step (61), or else go to Step (60).

Step (61): closing the first socket port of the active chassis management system;

Step (62): closing the second socket port of the standby chassis management system.

From the foregoing procedure, the server uses a universal communication protocol to create the virtual channel for performing a synchronous update between the active chassis management system and the standby chassis management system, and closes the virtual channel immediately after the update is completed, so that the server can have sufficient transmission bandwidth for the stable transmission of the change message. Further, the present invention uses the universal communication protocol to create the virtual channel and transmit the change message, so that the invention can be applied in various servers produced by different manufacturers, and thus it can overcome the shortcomings and incompatibility of the conventional chassis and switch management systems.

While the invention herein disclosed has been described by means of specific embodiments, numerous modifications and variations could be made thereto by those skilled in the art without departing from the scope and spirit of the invention set forth in the claims.

What is claimed is:

1. A method of updating a dual redundant chassis management system, which is applied in a server, and said server includes an active chassis management system and a standby chassis management system, such that if said server has a change message, said server will process the steps of:
    said active chassis management system receiving said change message, and updating a data based on said change message;
    creating a virtual channel between said active chassis management system and said standby chassis management system;
    said active chassis management system sending said change message to said standby chassis management system through said virtual channel;
    said standby chassis management system receiving said change message, and updating said data;
    said standby chassis management system sending a reply signal to said active chassis management system through said virtual channel, for noticing the completion of updating data; and
    said active chassis management system receiving said reply signal, and closing said virtual channel.

2. The method of claim 1, wherein said step of creating a virtual channel by said server further comprises the steps of:
    opening a first socket port at said active chassis management system;
    opening a second socket port at said standby chassis management system;
    said active chassis management system determining whether or not said first socket port is connected to said second socket port; and
    completing the creation of said virtual channel between said active chassis management system and said standby chassis management system, if said active chassis management system is connected to said second socket port through said first socket port.

3. The method of claim 2, wherein said server will send an error message to said active chassis management system if said active chassis management system cannot be connected to said second socket port through said first socket port, and said standby chassis management system will continue waiting for connecting with said active chassis management system, and said step of creating a virtual channel will be processed.

4. The method of claim 1, wherein said step of said server sending said change message in said active chassis management system further comprises the steps of:
    reading a change message that is to be written into said standby chassis management system through said virtual channel;
    determining whether or not said change message is written completely into said standby chassis management system through said virtual channel; and
    entering said active chassis management system into a status of waiting for receiving said replay signal sent from said standby chassis management system through said virtual channel, after said change message has been written completely into said standby chassis management system.

5. The method of claim 4, wherein said step for said server to send said change message to said active chassis management system will be processed, if said change message is not written completely into said standby chassis management system.

6. The method of claim 1, wherein said step for said server to receive a change message and update data in said standby chassis management system further comprises the steps of:
    reading said change message that is to be written into said standby chassis management system through said virtual channel;
    determining whether or not said written change message is complete; and
    updating said standby chassis management system based on said change message, if said read standby chassis management system is determined to be complete.

7. The method of claim 6, wherein said step for said server to receive a change message and update data in said standby chassis management system will be processed, if said change message read by said standby chassis management system is determined to be incomplete.

8. The method of claim 1, wherein said step for said standby chassis management system in said server to send said reply signal comprises the steps of:
    editing said reply signal based on an intelligent platform management interface (IPMI) message transmission format;
    sending said edited reply signal into a message queue of said standby chassis management system;
    reading a forefront reply signal of said message queue;
    determining whether or not said forefront reply signal of said message queue is complete; and
    sending said forefront reply signal of said message queue to said active chassis management system through said virtual channel, and then deleting said forefront reply signal of said message queue, and substituting said forefront replay signal by a successive replay signal in said message queue, if said forefront reply signal of said message queue is complete.

9. The method of claim 8, wherein said step for said standby chassis management system in said server to send said reply signal will be performed, if it is determined that said forefront replay signal of said message queue is not complete.

10. The method of claim 1, wherein said step of said server closing said virtual channel further comprises the steps of:
   said active chassis management system determining whether or not said received reply signal is complete;
   closing said first socket port of said active chassis management system, if said active chassis management system determines that said received reply signal is complete; and
   closing said virtual channel, when said standby chassis management system closes said second socket port.

* * * * *